E. T. BATES.
SURFACE COVERING.
APPLICATION FILED DEC. 29, 1911.
1,040,117.
Patented Oct. 1, 1912.
3 SHEETS—SHEET 2.
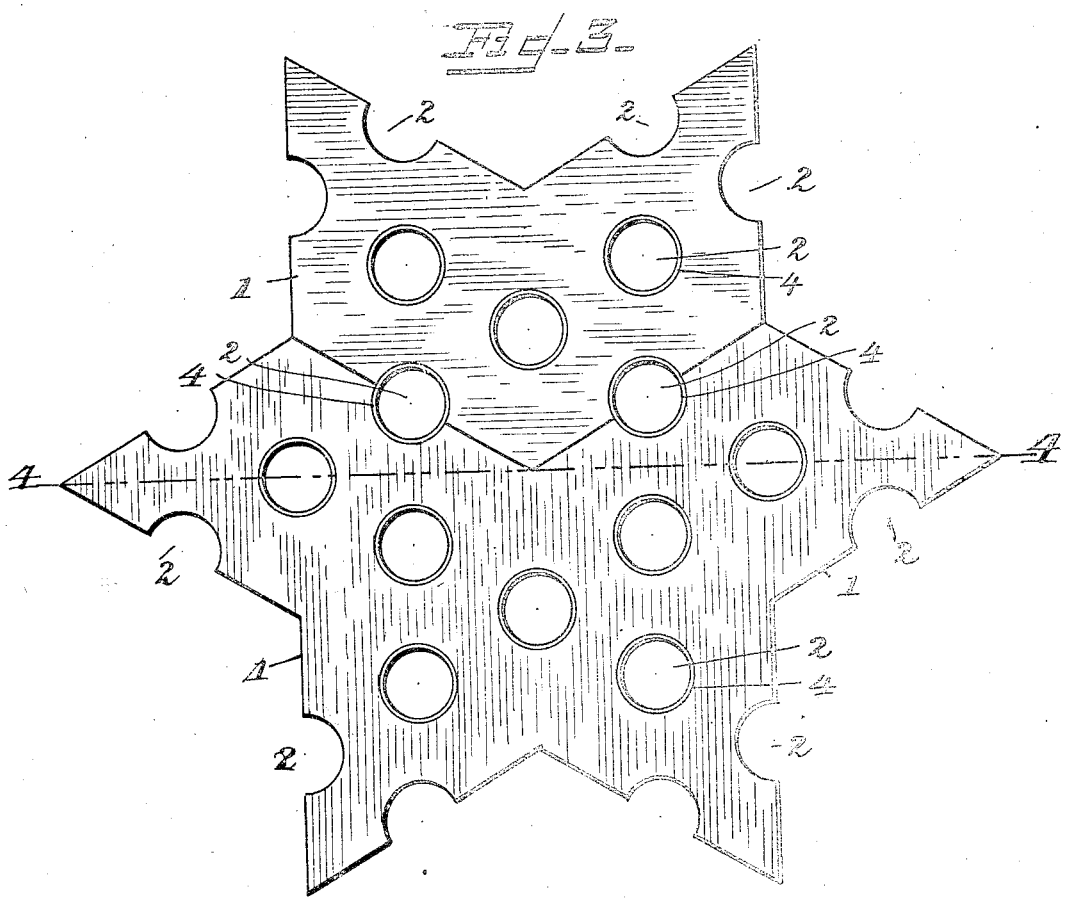
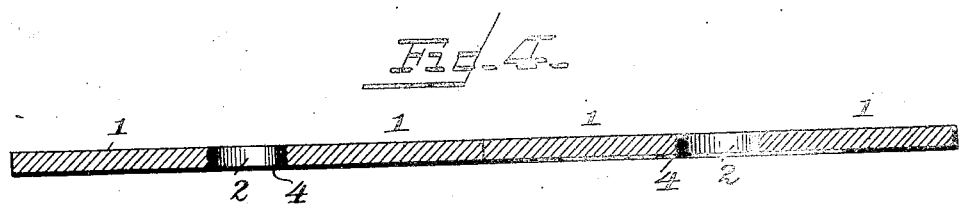
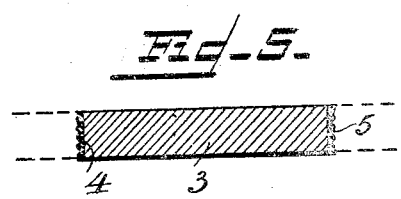
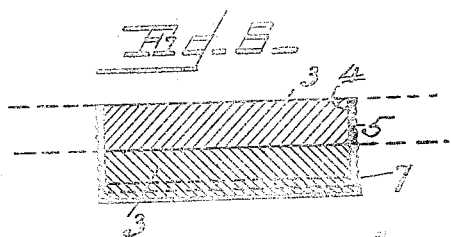
Witnesses
Chas. N. Ougand
W. Parker Kindle
Inventor
E. T. Bates
By D. C. Kindle
Attorney E. T. BATES.
SURFACE COVERING.
APPLICATION FILED DEC. 29, 1911.
1,040,117.
Patented Oct. 1, 1912.
3 SHEETS—SHEET 3.
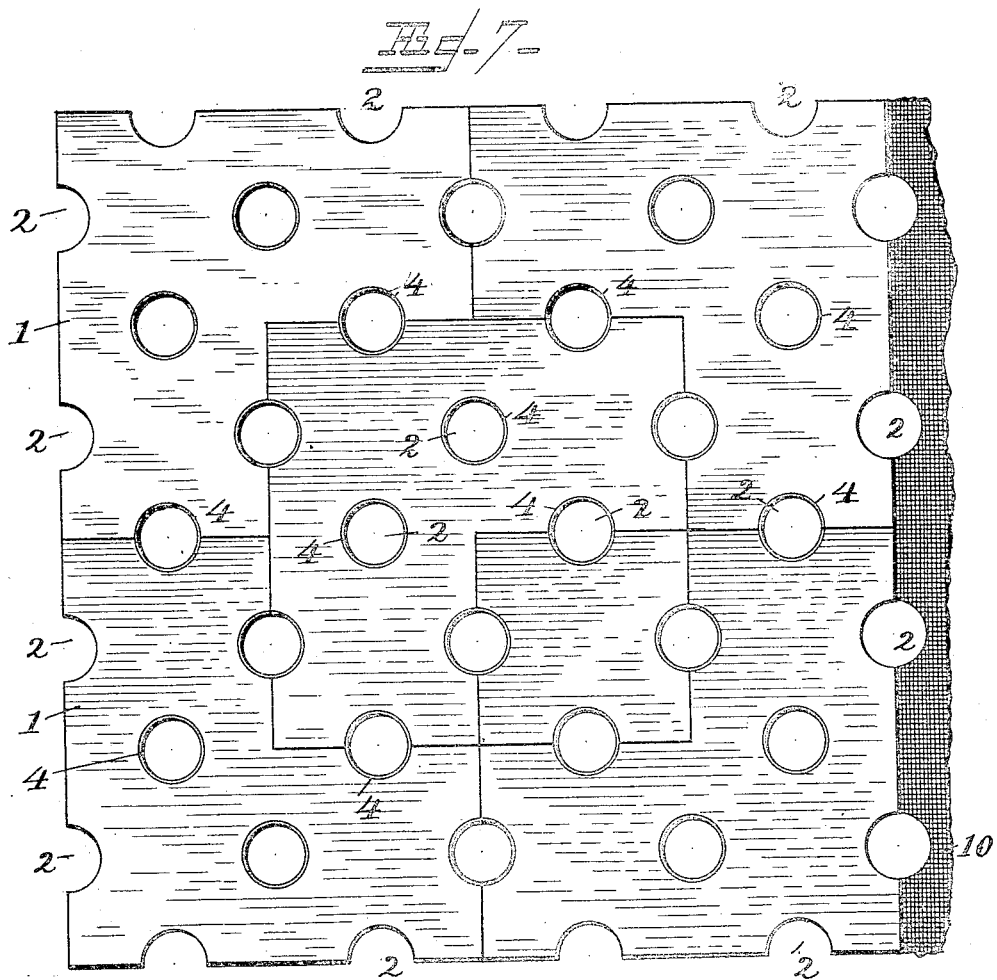
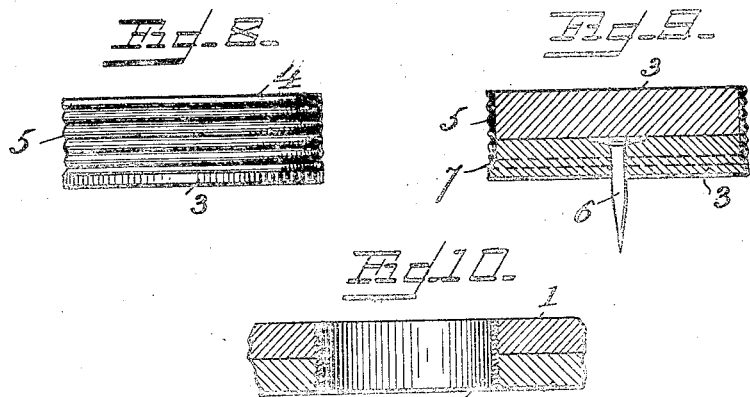
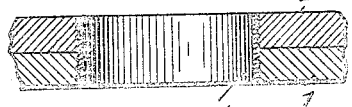

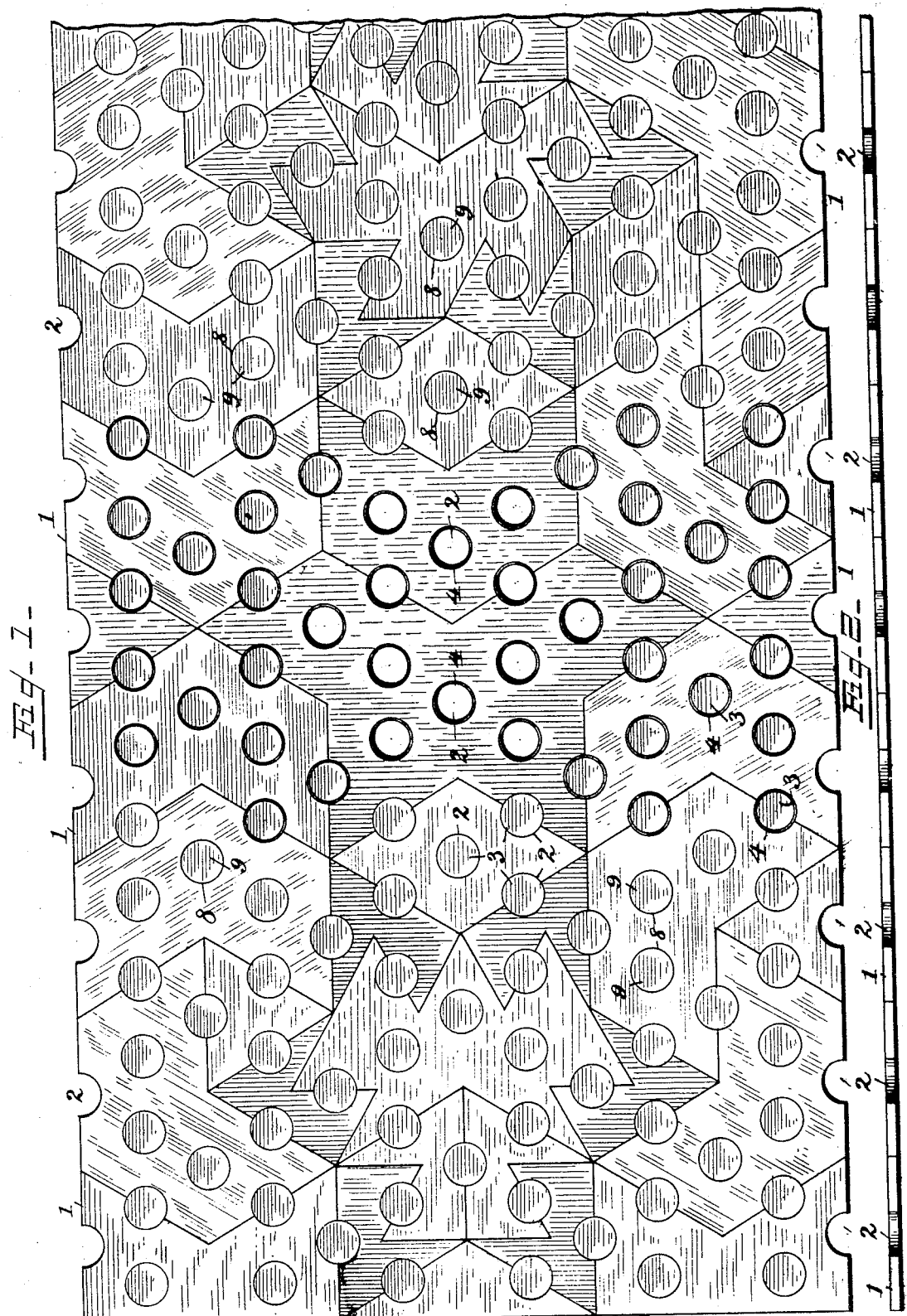

UNITED STATES PATENT OFFICE.

EDWARD T. BATES, OF WASHINGTON, DISTRICT OF COLUMBIA.

SURFACE-COVERING.

1,040,117.  Specification of Letters Patent.  Patented Oct. 1, 1912.

Application filed December 29, 1911. Serial No. 668,567.

*To all whom it may concern:*

Be it known that I, EDWARD T. BATES, a citizen of the United States, residing at Washington, in the District of Columbia, have invented certain new and useful Improvements in Surface-Coverings, and I do hereby declare the following to be a full, clear, and exact description of the invention, such as will enable others skilled in the art to which it appertains to make and use the same.

My invention relates to decorative art, such as floor and mural decorations, combining therewith utility, durability and economy, and has for its object the production of surface covering such as tiling, wainscoting, mats, or other decorative or useful surfaces which can be made highly ornamental by separating the tiles or units into parts and using a variety of colors to produce pleasing designs.

The invention consists in certain improvements in construction, whereby parts removed from one tile or unit or one color are interchangeable with like parts removed from tiles or units or other colors, and all the material from which the tiles or units are made, utilized without loss by waste or scrap ends.

Tile or other surface coverings molded of rubber, rubber compounds and the like are expensive and thereby greatly limited in their use. It is my purpose to produce a more economical article of the kind, without sacrificing any of the decorative, sanitary or other desirable qualities by using linoleum, rubber, or other suitable material and after suitable perforations are made, thereby removing key pieces of the desired shape, cutting the tiling or units from sheets of the desired material.

The invention will be fully disclosed in the following specification and claims.

In the accompanying drawings, which form part of this specification, Figure 1 represents a plan view, showing a plurality of tiles or units secured together thus forming an ornamental compact plane surface. Fig. 2 represents an edge view of the same. Fig. 3 is a plan view on an enlarged scale showing parts of Fig. 1. Fig. 4 is a transverse section on line 4—4, Fig. 3. Fig. 5 is a vertical transverse section of one of the key members on a further enlarged scale. Fig. 6 is a like view. Fig. 7 is a plan view showing another adaptation of the invention. Fig. 8 is a side elevation of the wall of the key member. Fig. 9 is a vertical transverse section of the key provided with means for securing it or the covering in position, and Fig. 10 is a vertical section showing two layers of material provided with said means.

Reference being had to the drawings and the designating characters thereon, the numeral 1 indicates sections of covering or tiles composed of angular units, combinations or subdivisions of such units, having abutting sides or edges, which units or parts when properly placed form a completed plane surface. The configuration of the tiles may be varied to suit taste, and conditions of use, and may thus be of any preferred form, so long as they are provided with abutting sides or edges.

In the sides or edges of the units are formed semi-circular recesses or openings 2, which when made to register with like semi-circular openings in an adjoining unit form circular openings, which are filled by armless locking members or keys 3. It is obvious that the locking members or keys 3 and the recesses 2 may be of other forms than circular, so long as they conform in shape and size and that the keys 3 are insertible from the upper surface of the covering, and effectually lock the members 1 and the subdivisions thereof together, and are also insertible and removable from the recesses 2 in the plane of the units when the abutting section or piece is removed.

It is found desirable in the construction of some covering or tiling to further remove portions by cutting one or more circular openings 8, 8, preferably of the diameter of the members 9, as shown in Fig. 1, which serves a two-fold purpose, first, by permitting of additional ornamentation, and also preventing buckling of the surface, by more evenly distributing the severing of the fiber. This also aids in distributing the pressure of wear throughout the surface.

The covering or tiles may be made of a variety of material and colors and placed in position to produce ornamental designs in great variety, or a surface combining hard or rigid materials with others more elastic, to utilize the durability of the former while securing the resilience and anti-slipping qualities of the latter, and the units may be secured to a backing 10 of textile material for convenience in handling, transportation and use, and the covering may be secured to a floor, wall or the like by cement.

There is practically no limit to changes in design that may be produced by the different colors of units and subdivisions and combinations thereof, and the artistic distribution of the members 1 and the subdivisions of said units and the keys 3.

The keys 3 are preferably provided with a wall 4 of greater density than the filling within the wall, such as metal or other hard material, the wall is roughened on the outer surface 5, by grooves or serrations, or in any preferred manner, and the filling may extend below the lower end of the wall 4 to form a cushion for the key.

The key may be provided with a suitable device, as 6, which for the purpose of illustration is shown as a nail with its head embedded between two layers of filling and the point of the nail extending beyond the filling and is designed to be driven in a floor, wall, ceiling or the like, or may be used for other purposes than securing units of surfaces in position.

The wall 4 may be driven in and embedded in the material 1 instead of first cutting out the stock to form the openings 2, and they may be driven down only part of the thickness of the said members and the units leaving a cushion of stock beneath them, or they may be made of a length equal to the thickness of the stock and driven through the same. Or they may be made of a length in excess of the thickness of the stock and secured into the foundation to protect the units against displacement.

The inner surface of the lower edge of the wall 4 of the keys may be beveled as shown at 7 to form a cutting edge to allow the wall to be driven into the stock and form the filling of the key 3, which may be done after the units are in place.

The covering or tiling is preferably made of linoleum, rubber, or other material in sheets that can be readily cut by sharp edged tools or knives into units having abutting reverse angles or subdivisions thereof which may represent right angled or equilateral triangles or subdivisions thereof, circles or other forms, as shown in the drawings. The locking members or keys may be cut out by dies or punches, or a suitable machine operated stamp or die may be used.

It will be observed that by separating the tiling into parts as described, no part of the material is lost or wasted, and the parts cut out of one tile will fit into a like opening in any other tile of like construction, there being no waste by the cutting and no ragged edges formed to resist insertion of locking members or keys. Furthermore, the distribution of the openings, and their filling members is such, that no buckling of the surface occurs, and repairs are easily and readily made, by displacing or removing injured or worn units and substituting new ones.

The units may be separated into numerous angular sections, or other divisions thereof may be made as desired to change the design being worked out, or the conditions required.

It is obvious that changes may be made in form of the units and the keys without departing from the spirit of my invention, or units of suitable material for the purpose, may be made into interesting and instructive toys by the almost unlimited combinations of colors and designs that can be constructed from two or more units of different colors.

It is also obvious that the rings or walls 4 may be applied to the covering either with the members 3 retained, or they may be applied without the use of said members, as shown in Figs. 1 and 3, in which 2 indicates openings or perforations in the covering, whose walls are formed by the rings or walls 4, thus producing a perforated covering or mat to allow dust to pass through.

It is also my purpose to construct covering of the same kind in which two thicknesses or layers of covering of different colors may be placed back to back, preferably connected together at their registering outer sides or edges, and the ring or wall 4 inserted in the two layers of covering as shown in Figs. 6 and 10, thus producting reversible coverings, such as rugs or mats.

In all of the described uses of the rings 4, the wearing surface of the covering is reinforced, and in covering exposed to excessive wear, a portion thereof may be made of large sections uncut, and ornamental borders of covering, such as shown in Fig. 1 attached thereto by the locking members and keys as described.

In Fig. 7 of the drawings I have shown the application of the locking members to units having right angled abutting sides or edges which are effectually locked together by the insertion of the locking members which are also insertible from the face or outer surface of the covering, and are laterally removable from the openings 2 in the plane of the units when adjoining units or subdivisions have been removed.

It will be observed that all abutting units are joined together by the keys so that they are secured against separation in the plane of the units and that the keys are removable in the plane of the units when an abutting unit has been removed.

Having thus fully described my invention, what I claim is:—

1. Flexible tiling comprising units interlocked and united in the plane of the surface, said units being provided with adjacent and registering salient and reëntrant angular sides and a recess or recesses in the sides, and each recess in a salient angle registering with a similar recess in the side of an abutting reëntrant angle of a unit; in combination with keys, each key engaging two of said recesses, uniting the units and intercepting all lines of separation of units in the plane of the surface.

2. Flexible tiling having abutting edges provided with a recess or recesses extending through the tiling; in combination with separate keys having surrounding walls of greater density than the tiles and permanently attached fillings extending beyond the lower edge of the wall.

3. Flexible tiling comprising a plurality of units having abutting edges provided with registering recesses extending through the tiling; in combination with keys having walls of greater density than the tiles, provided with roughened outer surfaces and surrounding a flexible filling.

4. Flexible tiling comprising a plurality of units having perforations extending through the tiling; in combination with members having walls of greater density than the body of said members and filling said perforations.

In testimony whereof I affix my signature in presence of two witnesses.

EDWARD T. BATES.

Witnesses:
D. C. REINOHL,
WILLIAM B. JACKSON.